(12) United States Patent
Roach et al.

(10) Patent No.: US 12,036,724 B2
(45) Date of Patent: Jul. 16, 2024

(54) SEALS FOR AERIAL VEHICLES

(71) Applicant: Aerostar International, LLC, Columbia, MD (US)

(72) Inventors: Kevin Roach, Sandpoint, ID (US); Chaokun Gong, Sunnyvale, CA (US); Chase Haegele, San Francisco, CA (US)

(73) Assignee: Aerostar International, LLC

( * ) Notice: Subject to any disclaimer, the term of this patent is extended or adjusted under 35 U.S.C. 154(b) by 252 days.

(21) Appl. No.: 17/557,990

(22) Filed: Dec. 21, 2021

(65) Prior Publication Data

US 2022/0184877 A1   Jun. 16, 2022

Related U.S. Application Data

(63) Continuation of application No. 16/547,150, filed on Aug. 21, 2019, now Pat. No. 11,230,049.

(51) Int. Cl.
| | | |
|---|---|---|
| *B29C 63/00* | (2006.01) | |
| *B29C 51/30* | (2006.01) | |
| *B29C 63/02* | (2006.01) | |
| *B29C 65/78* | (2006.01) | |
| *B29L 22/02* | (2006.01) | |
| *B64B 1/40* | (2006.01) | |
| *B64B 1/58* | (2006.01) | |

(52) U.S. Cl.
CPC .......... *B29C 63/0065* (2013.01); *B29C 63/02* (2013.01); *B29C 65/78* (2013.01); *B64B 1/40* (2013.01); *B64B 1/58* (2013.01); *B29C 51/303* (2013.01); *B29L 2022/022* (2013.01)

(58) Field of Classification Search
CPC ................................. B64B 1/40; B64B 1/58
See application file for complete search history.

(56) References Cited

U.S. PATENT DOCUMENTS

| | | | |
|---|---|---|---|
| 2,767,940 A | * | 10/1956 | Melton ..................... B64B 1/40 156/227 |
| 4,529,153 A | | 7/1985 | Conn |
| 4,877,205 A | | 10/1989 | Rand |
| 4,902,373 A | | 2/1990 | Regipa |
| 7,687,129 B2 | | 3/2010 | Liggett |

(Continued)

FOREIGN PATENT DOCUMENTS

| | | |
|---|---|---|
| GB | 2099751 A | 12/1982 |
| WO | WO-9722470 A1 | 6/1997 |

(Continued)

OTHER PUBLICATIONS

"Indian Application Serial No. 202217014835, First Examination Report mailed Jul. 6, 2022", 5 pgs.

(Continued)

*Primary Examiner* — Philip J Bonzell
*Assistant Examiner* — Eric Acosta
(74) *Attorney, Agent, or Firm* — Kim and Lahey Law Firm, LLC; Seann Lahey

(57) ABSTRACT

Aspects of the disclosure relate to envelopes for aerial vehicle. The aerial vehicle may include an envelope including a plurality of gores. The aerial vehicle may also include a seal arranged between a pair of the plurality of gores, the seal including six layers of envelope material heat-sealed together.

16 Claims, 6 Drawing Sheets

(56) References Cited

U.S. PATENT DOCUMENTS

| | | | |
|---|---|---|---|
| 9,254,906 | B1 | 2/2016 | Behroozi et al. |
| 9,296,461 | B1 | 3/2016 | Roach |
| 9,845,140 | B2 | 12/2017 | Crites |
| 10,029,776 | B1 | 7/2018 | Fourie et al. |
| 10,173,764 | B1 | 1/2019 | Fourie et al. |
| 2009/0080812 | A1 | 3/2009 | Schmal et al. |
| 2014/0015694 | A1 | 1/2014 | Teller et al. |
| 2015/0174817 | A1* | 6/2015 | Roach .................. B29C 66/3452 156/64 |
| 2015/0367928 | A1 | 12/2015 | Crites |
| 2016/0221661 | A1 | 8/2016 | Bohannon |
| 2017/0368809 | A1 | 12/2017 | Sakellarides et al. |
| 2018/0109223 | A1 | 4/2018 | Panas et al. |
| 2019/0039709 | A1 | 2/2019 | Crites |
| 2021/0053274 | A1 | 2/2021 | Roach et al. |

FOREIGN PATENT DOCUMENTS

| | | |
|---|---|---|
| WO | WO-2019028188 A1 | 2/2019 |
| WO | WO-2021034835 A1 | 2/2021 |

OTHER PUBLICATIONS

"U.S. Appl. No. 16/547,150, Non Final Office Action mailed Apr. 13, 2021", 49 pgs.

"U.S. Appl. No. 16/547,150, Notice of Allowance mailed Sep. 14, 2021", 9 pgs.

"U.S. Appl. No. 16/547,150, Response filed Mar. 18, 2021 to Restriction Requirement mailed Mar. 17, 2021", 5 pgs.

"U.S. Appl. No. 16/547,150, Response filed Aug. 13, 2021 to Non Final Office Action mailed Apr. 13, 2021", 8 pgs.

"U.S. Appl. No. 16/547,150, Restriction Requirement mailed Mar. 17, 2021", 7 pgs.

"BoPET", Wikipedia, Wikimedia Foundation, <web.archive.org/web/20190403133410/en.wikipedia.org/wiki/BoPET>, (Apr. 3, 2019).

"International Application Serial No. PCT/US2020/046814, International Search Report mailed Nov. 27, 2020", 3 pgs.

"International Application Serial No. PCT/US2020/046814, Written Opinion mailed Nov. 27, 2020", 4 pgs.

\* cited by examiner

400

SEALS FOR AERIAL VEHICLES

RELATED APPLICATIONS

This application is a continuation of U.S. application Ser. No. 16/547,150, filed Aug. 21, 2019, which application is incorporated by reference herein in its entirety.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a network of aerial vehicles operating in the stratosphere. Because of the various forces experienced by these aerial vehicles during deployment and operation, there is a balancing of needs between flexibility and stability of envelope materials. In some instances, the envelopes of these aerial vehicles may be made of envelope materials configured in sections or lobes to create a "pumpkin" or lobed balloon. The lobes are supported by a plurality of tendons.

BRIEF SUMMARY

One aspect of the disclosure provides an aerial vehicle including an envelope including a plurality of gores and a seal arranged between a pair of the plurality of gores, the seal including six layers of envelope material heat-sealed together. In addition, a first layer of the envelope material is a first strip of envelope material, adjacent to the first layer of the envelope material is a second layer of the envelope material which is a second strip of envelope material, adjacent to the second layer of envelope material is a third layer of envelope material which is a first gore of the pair, adjacent to the third layer of envelope material is a fourth layer of the envelope which is a second gore of the pair, adjacent to the fourth layer of envelope material is a fifth layer of the envelope material, and adjacent to the fifth layer of the envelope material is a sixth layer of the envelope material corresponding to a folded portion of the fifth layer of the envelope material.

In one example, the aerial vehicle also includes a tendon arranged between the fifth layer of the envelope material and sixth layer of the material. In another example, the first, second, third, fourth, fifth, and sixth layers of envelope material are each biaxial oriented polyethylene film.

Another aspect of the disclosure provides a method of forming a seal between two gores of an envelope for an aerial vehicle. The method includes arranging a second layer of the envelope material on a first layer of envelope material, wherein the first layer of envelope material is a first strip of envelope material and the second layer of envelope material is a second strip of envelope material; arranging a third layer of envelope material on the second layer of envelope material, the third layer of envelope material corresponding to a first of the two gores; arranging a fourth layer of envelope material on the third layer of envelope material, the third layer of envelope material corresponding to a second of the two gores; arranging a fifth layer of envelope material on the fourth layer of envelope material such that adjacent to the fifth layer of the envelope material is a sixth layer of the envelope material corresponding to a folded portion of the fifth layer of the envelope material; and heat-sealing the first, second, third, fourth, and fifth layers of envelope material to one another to create a single seal.

In one example, heat-sealing involves healing the first, second, third, fourth, and fifth layers of envelope material from both the first layer of envelope material and the sixth layer of envelope material at the same time. In this example, healing the first, second, third, fourth, and fifth layers of envelope material from both the first layer of envelope material and the sixth layer of envelope material at the same time reduces a likelihood of overheating the third and fourth layers. In another example, the method also includes placing a tendon between the fifth and sixth layers of envelope material such that after the heat-sealing, the tendon is arranged between the fifth and sixth layers of envelope material. In another example, the first, second, third, fourth, fifth, and sixth layers of envelope material are each biaxial oriented polyethylene film. In another example, the method also includes providing tension to the first, second, third, fourth, and fifth layers of envelope material during the heat-sealing using one or more pairs of nip rollers. In this example, the method also includes using the nip rollers to provide tension while allowing the single seal to cool after the heat-sealing. In addition or alternatively, the method also includes using cooling bars to allow the single seal to cool after the heat-sealing. In this example, the cooling includes allowing the single seal to cool without the use of cooling bars. In another example, the method also includes using one or more pairs of nip rollers to provide tension during cooling of the single seal. In this example, the cooling includes allowing the single seal to cool without the use of cooling bars. Alternatively, the method includes using cooling bars to allow the single seal to cool after the heat-sealing.

DETAILED DESCRIPTION

Figure 1:
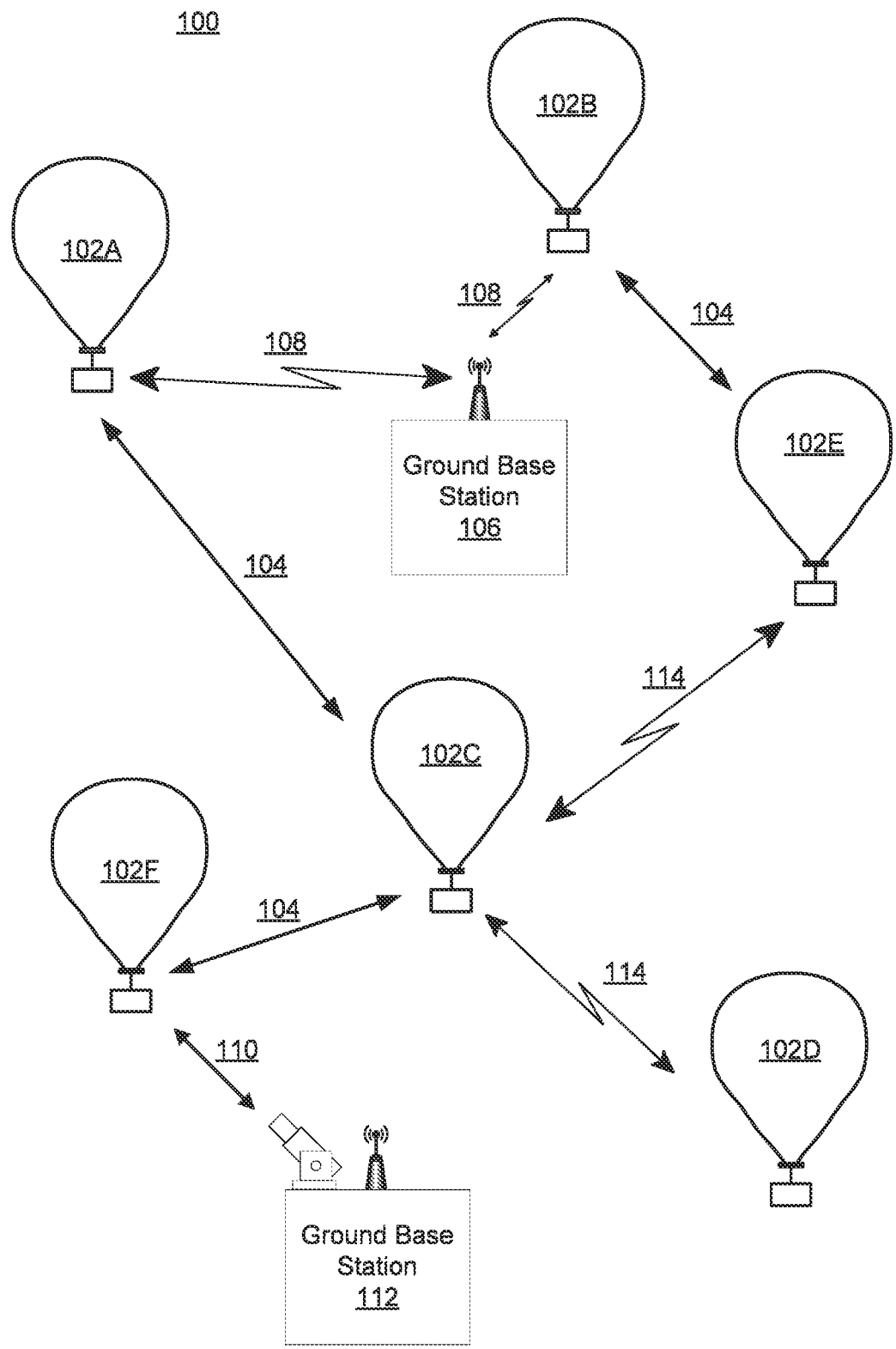
FIG. 1 is a functional diagram of a system in accordance with aspects of the present disclosure.

The present disclosure generally relates to manufacturing envelope material for aerial vehicles such as high-altitude balloons. As an example, a gored-shape balloon may have 48 gores or more or less which are heat-sealed at their common edges to join them to one another. The materials selected for the gores may be highly oriented plastics which require a more robust and rigorous approach to modification of the sealing process to ensure quality seals with minimal defects and rework. In addition, improving seal quality is crucial to extending the working life (i.e. flight time) of the aerial vehicle to meet servicing and other needs.

The envelope material described herein may be formed from biaxial oriented polyethylene films. For instance, an oriented film may be one that has been stretched while in a softened state while at a temperature below that at which the film layer was initially extruded by a cast or blown bubble technique. In addition, "biaxially" may refer to the fact that the cast or blown bubble film has been stretched in opposing directions, such as both a machine direction and a direction transverse to the machine direction.

Typical polyethylene films may be relatively easy to sealing as such films are generally comprised of thermoplastic polymer with a melting temperature of approximately 120° C. Once above the melting temperature, the polymer will melt and polymer chains in two layers of film will diffuse and inter penetrate with one another to form an inter-layer bond. Upon cooling, the interpenetrated polymer nets will be solidified and a crystalline structure will form during cooling. Thus, a seal that as strong as each of the original polyethylene films will form easily.

However, it is significantly more difficult to achieve a seal as strong as the original film seal for biaxial oriented polyethylene films. In fact, when using typical heat-sealing approaches, the biaxial oriented polyethylene films will not retain their highly stretched polymer chain level orientation and microstructure. As such, the seal between two layers of this film cannot be as strong as the original film layers.

In order to improve seal quality, a number of layers of envelope material may be arranged together and then heat-sealed. For instance, a second layer of envelope material may be arranged over a first layer of envelope material. A third layer of envelope material, which will become a first gore, may be placed on the second layer of envelope material. Thereafter, a fourth layer of envelope material, which will become a second gore, may be placed on top of the third layer of envelope material. A fifth and sixth layer of envelope material may be placed on top of the second layer of envelope material. The layers of envelope material may be heat-sealed from both the outer surfaces.

In order to improve the ease of the heat-sealing, tension may be applied to the six layers of envelope material. As the heat-sealed layers of envelope material cool after the heat-sealing, the biaxial oriented polyethylene has a tendency to shrink resulting in thicker seals. To address this, the cooling of the heat-sealed six layers of envelope material may occur under tension. Cooling the heat-sealed six layers of envelope material may reduce the likelihood of shrinking during the cooling process and may therefore result in a more consistent and stronger heat seal for the envelope material. In some examples, the heat-sealed six layers of envelope material may be cooled using cooling bars. Alternatively, the cooling bars may not be used. Rather, the heat-sealed six layers of envelope material may simply be "air cooled" or allowed to return to ambient temperature naturally while under the tension.

The features described herein provide for manufacture of aerial vehicles including envelopes with gores made from highly oriented film. In addition, the features described herein provide for improved seal quality and thereby improved flight time. In addition, the six-layer configuration of layers described herein may provide for a simple fin seal which avoids the complexities of arranging and securing materials required for a lap seal.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example System

FIG. 1 depicts an example system 100 in which an aerial vehicle as described above may be used. This example should not be considered as limiting the scope of the disclosure or usefulness of the features of the present disclosure. For example, the techniques described herein can be employed on various types of standalone aerial vehicles with envelopes such as balloons or envelopes used with other types of systems. In this example, system 100 may be considered a "aerial vehicle network." the system 100 includes a plurality of devices, such as aerial vehicles 102A-F, ground base stations 106 and 112 and links 104, 108, 110 and 114 that are used to facilitate intra-balloon communications as well as communications between the base stations and the aerial vehicles. One example of an aerial vehicle is discussed in greater detail below with reference to FIG. 2.

Example Aerial Vehicle

Figure 2:
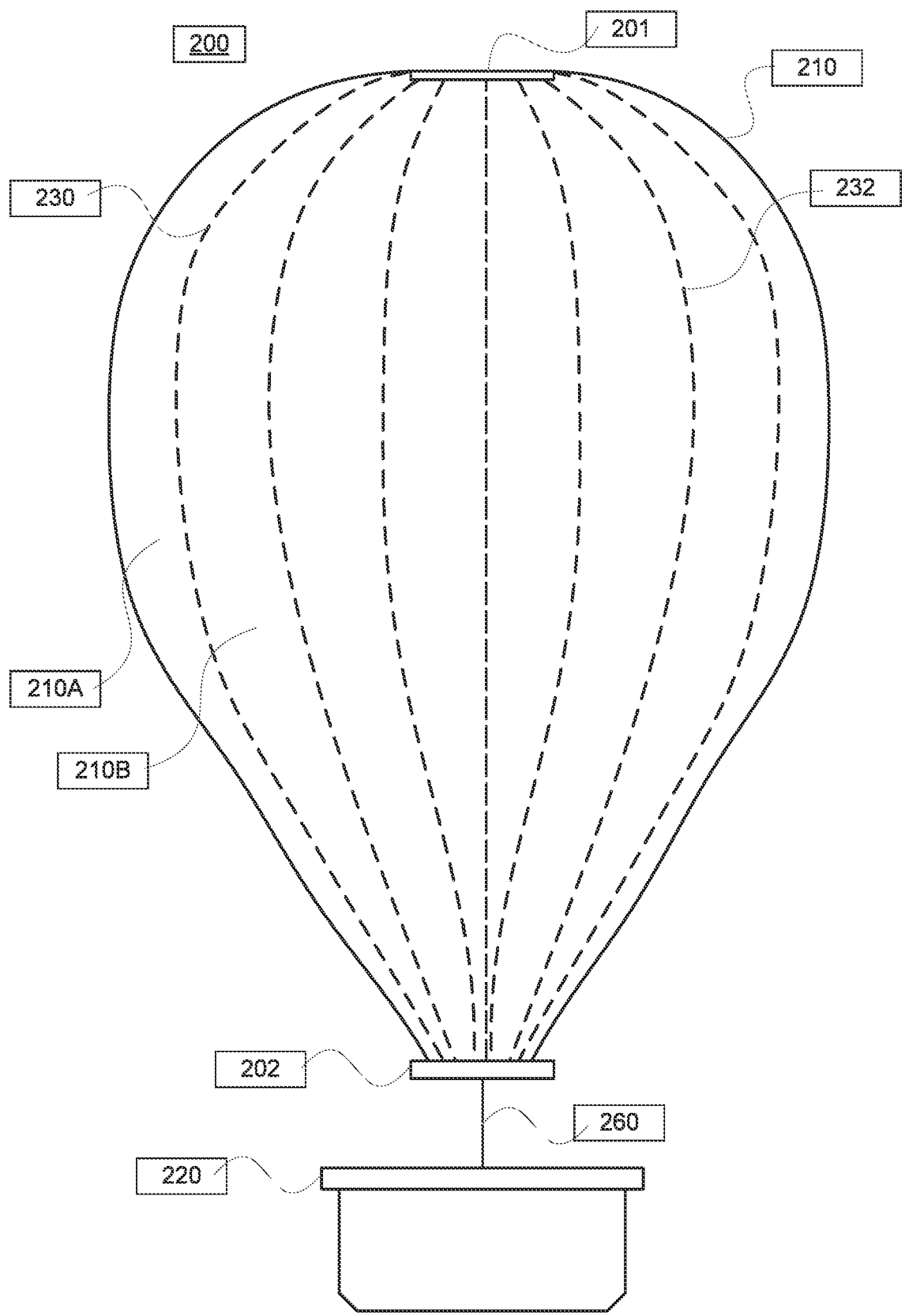
FIG. 2 is an example of an aerial vehicle in accordance with aspects of the present disclosure.

FIG. 2 is an example aerial vehicle 200, which may represent any of the aerial vehicles of system 100. As shown, the aerial vehicle 200 includes an envelope 210, a payload 220 and a plurality of tendons 230, 240 and 250 attached to the envelope 210.

The envelope 210 may take various forms. In one instance, the envelope 210 may be constructed from materials such as polyethylene that do not hold much load while the aerial vehicle 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of aerial vehicle 200 may be affixed to the envelope by a connection 260 such as a cable. The payload 220 may include a computer system (not shown), having one or more processors and on-board data storage. The pay load 220 may also include various other types of equipment and systems (not shown) to provide a number of different functions. For example, the payload 220 may include an optical communication system, a navigation system, a positioning system, a lighting system, an altitude control system and a power supply to supply power to various components of aerial vehicle 200.

In view of the goal of making the envelope 210 as lightweight as possible, it may be comprised of a plurality of envelope lobes or gores that have a thin film, such as polyethylene or polyethylene terephthalate, which is lightweight, yet has suitable strength properties for use as an envelope. In this example, envelope 210 is comprised of envelope gores 210A-210D.

Pressurized lift gas within the envelope 210 may cause a force or load to be applied to the aerial vehicle 200. In that regard, the tendons 230-250 provide strength to the aerial vehicle 200 to carry the load created by the pressurized gas within the envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of envelope 210. Bottom ends of the tendons 230, 240 and 250 may also be connected to one another. For example, a corresponding apparatus, e.g., base plate 202, may be disposed at a base or bottom of the envelope 210. The top plate 201 at the apex may be the same size and shape as and base plate 202 at the bottom of the envelope. Both plates may include corresponding components for attaching the tendons 230, 240 and 250 to the envelope 210.

Example Envelope Material

The envelope material described herein may be biaxial oriented polyethylene films. For instance, an oriented film may be one that has been stretched while in a softened state while at a temperature below that at which the film layer was initially extruded by a cast or blown bubble technique. For example, the polyethylene polymer of the envelope material may be stretched at softened state with a double bubble blown film line. Prior to stretching, the polyethylene polymer is treated under electron-beam irradiation to allow cross-link structure formed to improve polymer molten state strength, Therefore, the stretching process can be done to molten state polyethylene polymer successfully without bubble breaking or bubble collapse.

In addition, "biaxially" may refer to the fact that the cast or blown bubble film has been stretched in opposing directions, such as both a machine direction and a direction transverse to the machine direction. For example, the polyethylene polymer film of the envelope material may be biaxially stretched on a double bubble blown film line. The machine direction may be stretched to be 4 or more or less times of original dimensions, and the transverse direction may be stretched to be 4.8 or more or less times of the original dimensions. As compared to typical polyethylene blown film processes, the machine direction may be stretched less than 3 times the original dimensional while the transverse direction is between 2 to 3 times the original dimension, which means that the envelope material described may have a different microstructure than typical polyethylene films and therefore unique properties when being heat-sealed to itself.

Biaxial oriented polyethylene films are strong due to their biaxially oriented nature. In addition, the use of biaxial oriented polyethylene films may provide for better optical clarity, improved dart drop resistance, will shrink upon heating, has a lower tearing strength, improved puncture resistance, as well as greater stiffness as compared to other types of polyethylene films. In fact, because the stretching ratio (4.0 in the machine direction and 4.8 in the transverse direction) is much higher than the typical polyethylene films, the biaxial oriented polyethylene films have a tendency to want to shrink.

Typical polyethylene films may be relatively easy to sealing as such films are generally comprised of thermoplastic polymer with a melting temperature of approximately 120° C. Once above the melting temperature, the polymer will melt and polymer chains in two layers of film will diffuse and inter penetrate with one another to form an inter-layer bond. Upon cooling, the interpenetrated polymer nets will be solidified and a crystalline structure will form during cooling. Thus, a seal that as strong as each of the original polyethylene films will form easily.

However, may be significantly more difficult to achieve a seal as strong as the original film seal for biaxial oriented polyethylene films. In fact, when using typical heat-sealing approaches, the biaxial oriented polyethylene films will not retain their highly stretched polymer chain level orientation and microstructure. As such, the seal between two layers of this film cannot be as strong as the original film layers.

Example Seal and Method

Figure 3:
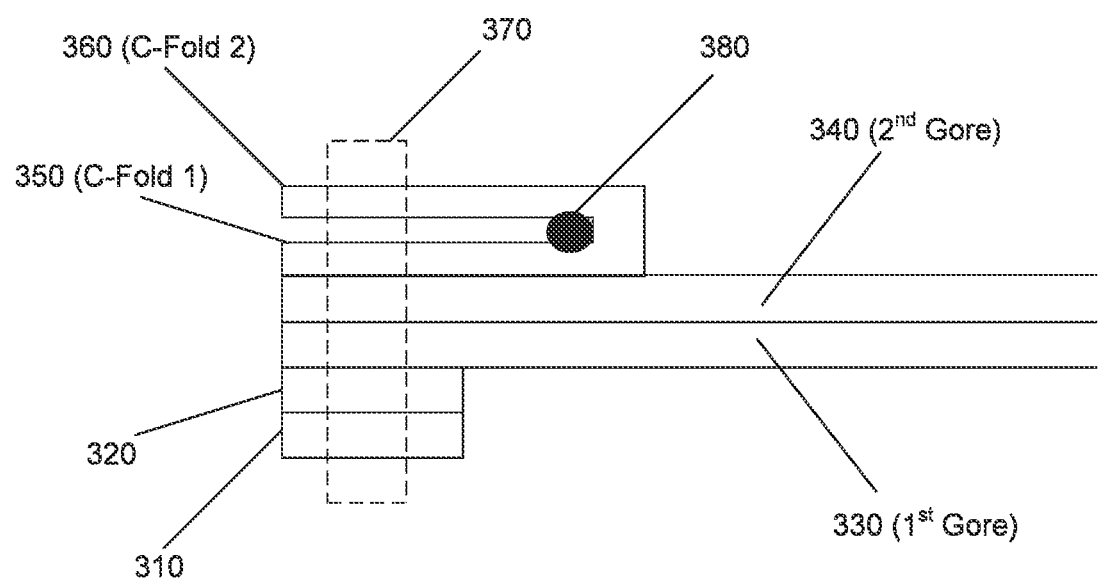
FIG. 3 is an example arrangement of envelope material in accordance with aspects of the disclosure.

In order to improve seal quality, a number of layers of envelope material may be arranged together and then heat-sealed. FIG. 3 is an example arrangement of envelope material in accordance with aspects of the disclosure. In this example, the thickness of the layers is exaggerated for ease of understanding. For instance, the thickness of each layer may be on the order of 1.5 mil. The material is depicted as arranged in a six-layer configuration prior to sealing and, in these examples, each layer is biaxial oriented polyethylene as described above. For example, the first layer 310 of envelope material which may be, for instance, a 1 inch wide strip of the biaxial oriented polyethylene. The second layer 320 of envelope material which may be, for instance, a 1-inch wide strip of the biaxial oriented polyethylene. The third layer 330 of envelope material may be part of a gore of the envelope and may also be biaxial oriented polyethylene. The fourth layer 340 of envelope material may be part of a gore of the envelope and may also be biaxial oriented polyethylene. The fifth layer 350 of envelope material and the sixth layer 360 of envelope material may be formed from a 4-inch-wide strip of the biaxial oriented polyethylene folded in a c-shape or c-fold, such that each of these layers is approximately 2 inches wide. These six layers may be arranged on a table and/or held in place with respect to one another using clamps, sand bags or other such devices.

Figure 4:
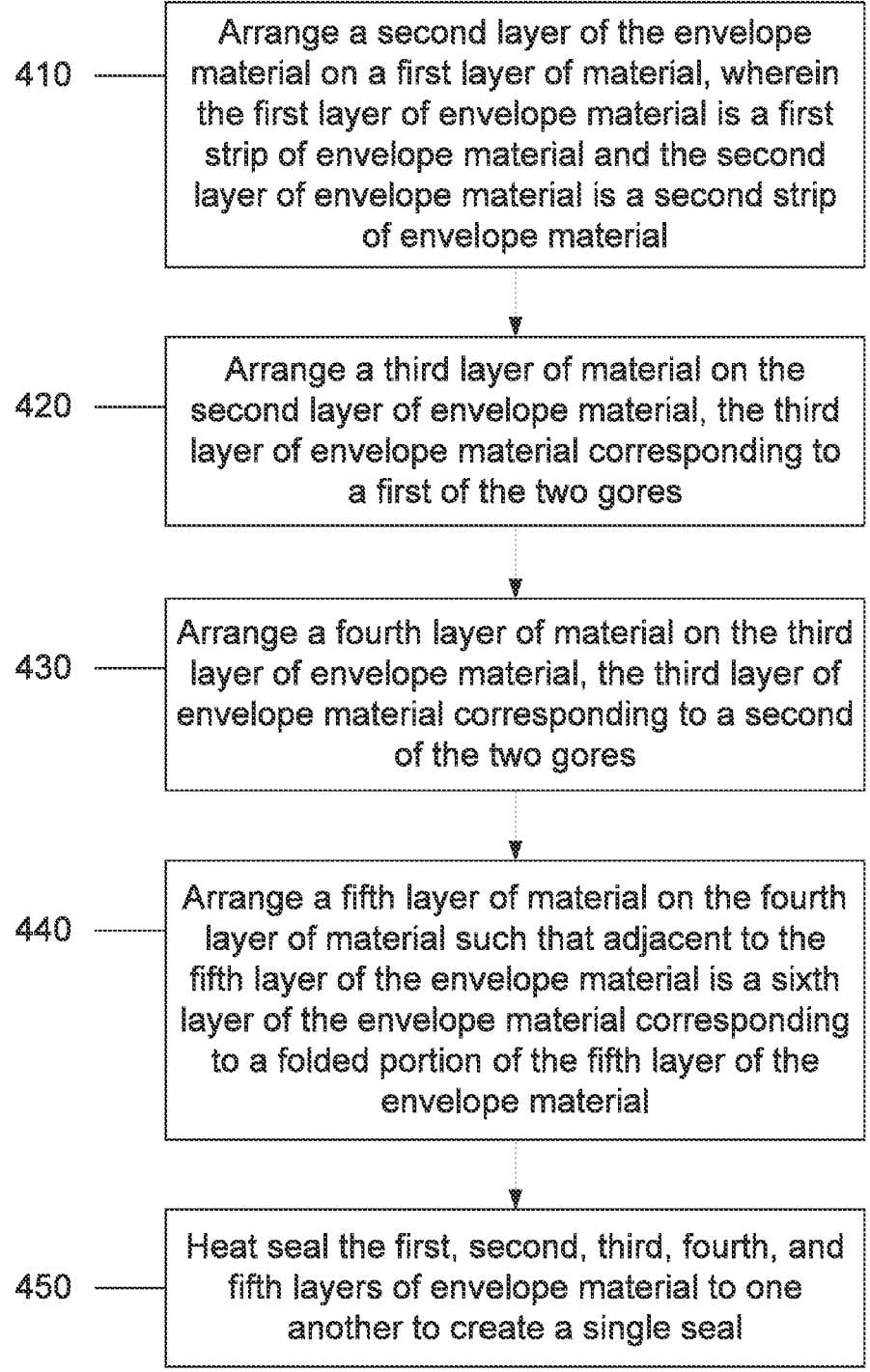
FIG. 4 is an example flow diagram in accordance with aspects of the disclosure.

FIG. 4 is an example flow diagram in accordance with aspects of the disclosure. In this example, a second layer of envelope material is arranged over a first layer of envelope material as shown in block 410. Each of the first and second layers of envelope materials are strips of envelope material. A third layer of envelope material may be placed on the second layer of envelope material as shown in block 420. This third layer of envelope material may correspond to a first of two gores. Thereafter, a fourth layer of envelope material which will become a second gore may be placed on top of the third layer of envelope material as shown in block 430. This third layer of envelope material may correspond to a second of the two gores. A fifth and sixth layer of envelope material may be placed on top of the second layer of envelope material as shown in block 440. At block 450, the first, second, third, fourth, and fifth layers of envelope material are heat-sealed to one another to create a single seal. For instance, returning to FIG. 3, the first, second, third, fourth and fifth layers may be heat-sealed to one another at the location of seal area 370. This process may be repeated with additional layers of envelope materials and gores until a desired number of gores is achieved.

Increasing the number of layers can both avoid overheating of the third and fourth layers (which will become the gores) and may also improve the load sharing effect for different sides of the seals and in some cases can improve the strength of the single seal when a peel force is applied (i.e. when to sealed pieces of envelope material, such as the first and second gore, are pulled away from one another) by as much as 30%.

Highly cross-linked and oriented material such as the biaxial oriented polyethylene described above can be difficult to seal successfully as the melt flow index is low. As such, given the number of layers of envelope material (here six), heating from only one outer surface may cause overheating at that surface in order to generate enough heal at the other outer surface. This can also create areas of stress and weaknesses at the seals. To address this, the layer may be heat-sealed from both the outer surfaces (i.e. from the top and the bottom). For example, turning to FIG. 5, the six-layer configuration of envelope material may be heat-sealed by heat-sealing at the first layer 310 and the sixth layer 360 at the same time using a pair of heat-sealing bars 510, 520 being arranged over one another, for instance and moved in the directions of arrows 512 and 522 towards one another, respectively. While the heat-sealing bars may contact the first layer and/or the sixth layer, they need not actually apply a compression force while heat sealing. Again, in the example of FIG. 5, the thickness of the layers is exaggerated for ease of understanding.

The heat-sealing bars may be configured to heat the six layers of envelope material to 325 to 475 degrees Fahrenheit, for instance, depending upon the thickness of the envelope material and the temperature of the heat-sealing bars. The heat sealing bars may also be sized to create a seal of a particular width. For example the width of the single seal may be between 1/16 to 1/2 inch wide. In this way, the six layers of envelope material will form a single seal including all six layers of the biaxial oriented polyethylene material. This may allow for the use of lower sealing temperatures as would normally be required if the six layers were being heat-sealed from only a single side (i.e. only the first layer 310 or the sixth layer 360). When the heat-sealing is completed, the heat-sealing bars 510, 520 may be pulled away from one another.

Figure 5:
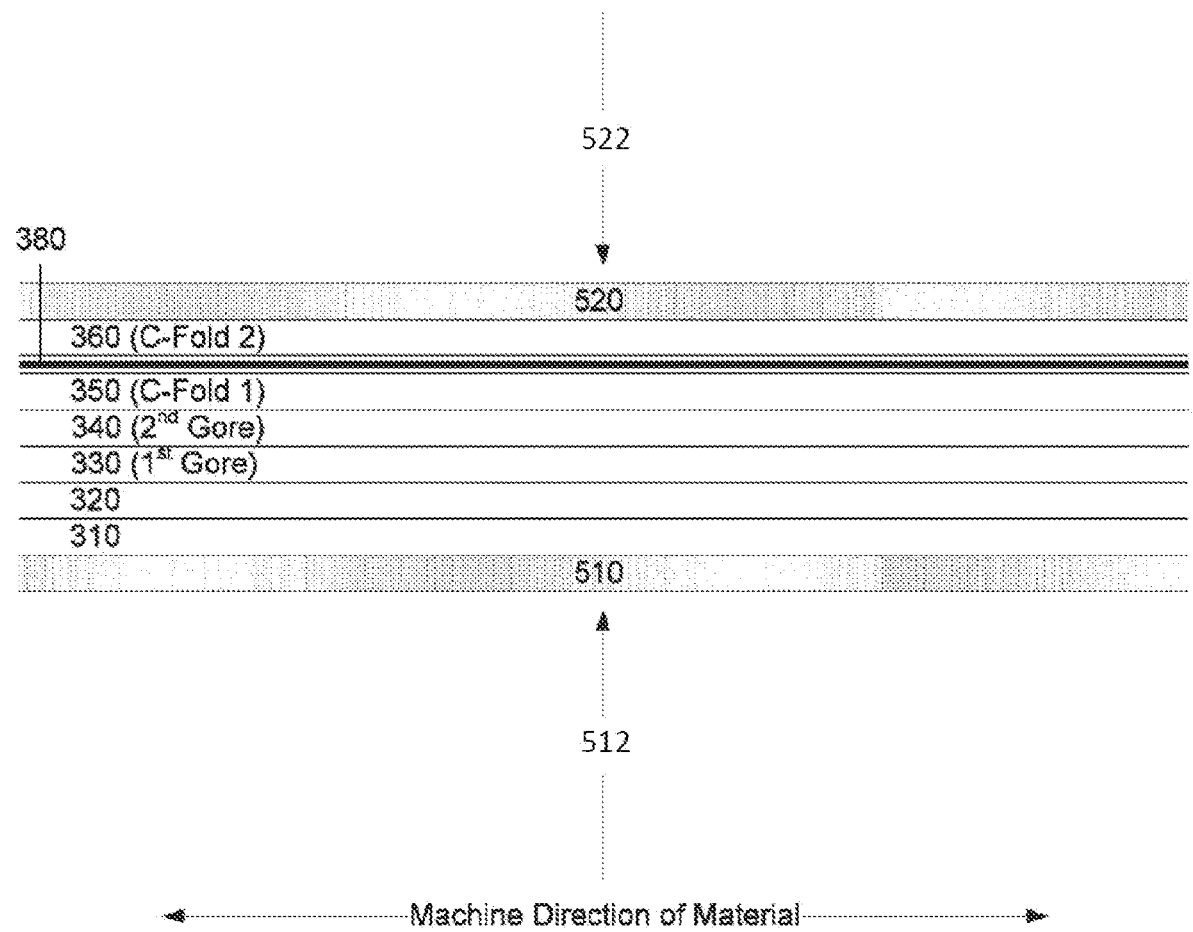
FIG. 5 is an example of sealing material in accordance with aspects of the disclosure.

In some instances, a tendon may also be included in the layers. In one example, as shown in FIGS. 3 and 5, a tendon 380 may be placed within the c-fold of the fifth layer and the sixth layer of the material. The tendon may be arranged on what will become an external side of the envelope in order to reduce stress on the envelope caused by the tendon.

Figure 6:
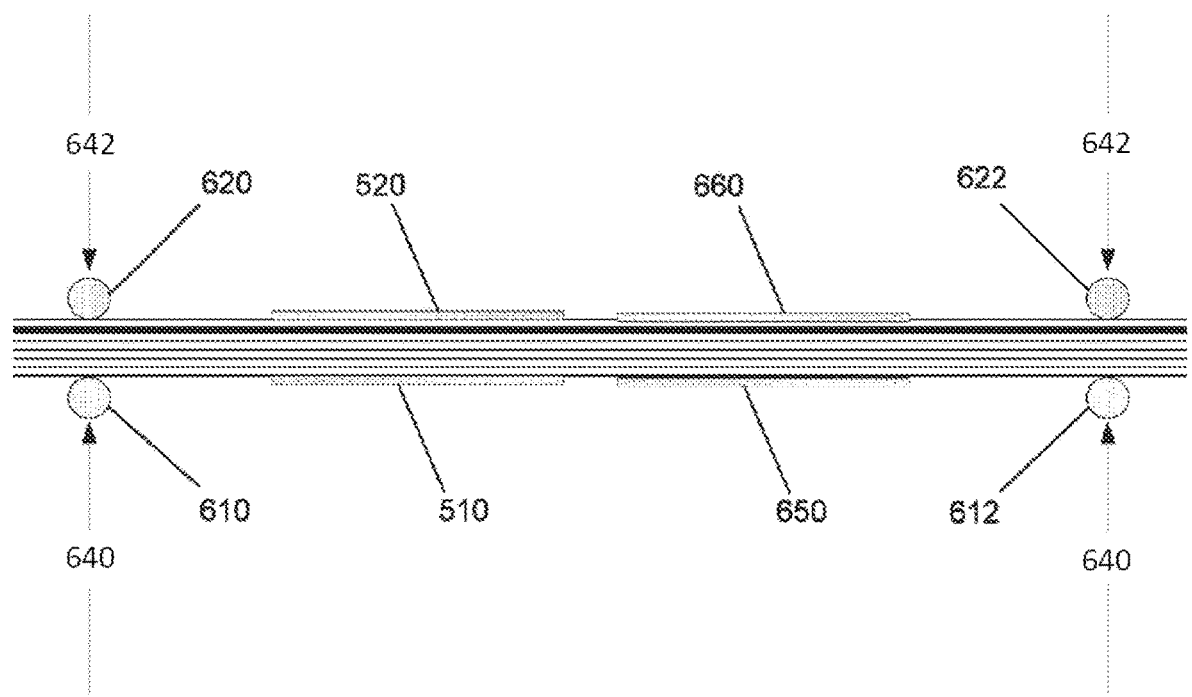
FIG. 6 is an example of sealing material while tensioning the material in accordance with aspects of the disclosure.

In order to improve the case of the heat-sealing as well as seal strength and performance, tension may be applied to the six layers of envelope material at the seal area 370. In this regard, the tension need not be applied to other areas of the layers of material. Tension may be applied in various ways, including for instance, via nip rollers, clamping, tension bars, etc. FIG. 6 is an example of sealing material while tensioning the material in accordance with aspects of the disclosure. In this example, the thickness of the layers is exaggerated for ease of understanding and although the tendon is visible, it is not arranged between the nip rollers or heat-sealing bars, but behind them with respect to the page. In this example, two pairs of nip rollers, 610, 620 and 612, 622 may be used to apply tension to the material. The nip rollers may provide tension and may also allow the six layers of envelope material to slide between the pairs of nip rollers which may be rolled in different directions in order to move the six layers of envelope material to the left or the right with respect to the page as needed.

In order to provide tension one or both of nip rollers 610, 620 may be forced against the six layers of envelope material in the direction of arrows 640, 642, respectively. Similarly, in order to provide tension one or both of nip rollers 612, 622 may be forced against the six layers of envelope material in the direction of arrows 640, 642, respectively. In other words, each pair of nip rollers may apply a relative force in the machine direction between the two for tension to occur. Tension can be applied by leading (before heating) nip rollers, for example nip rollers 610, 620, by clamping the six layers of envelope material and maintaining a specific feed rate. Trailing nip rollers, for example nip rollers 612, 622, may tension the film using torque control or a higher feed rate than the leading nip rollers.

As the heat-sealed layers of envelope material cool after the heat-sealing, the biaxial oriented polyethylene has a tendency to shrink resulting in thicker seals. To address this, the cooling of the heat-sealed six layers of envelope material may occur under tension. Cooling while the heat-sealed six layers of envelope material are under tension may reduce the likelihood of shrinking during the cooling process and may therefore result in a more consistent and stronger heat seal for the envelope material. In addition, when each of the six layers of envelope material are arranged in the machine direction with respect to one another prior to the heat-sealing as shown in FIG. 5 (into the page in FIG. 3), and may be sealed along the machine direction. During cooling, when under tension in the machine direction, the heat-sealed six layers of envelope material may only be allowed to shrink in a single direction which may correspond to the direction transverse to the machine direction. For example, the nip rollers 610, 620, 640, 650 (or other nip rollers) may be used to provide tension during the cooling process.

In some examples, the heat-sealed six layers of envelope material may be cooled, for instance to the ambient temperature (e.g. room temperature) or colder, using cooling bars 650, 660, configured similarly to the heat-sealing bars of FIG. 5. In some instances, the cooling bars 650, 660 may be wider or narrower than the heat-sealing bars 610, 620. For example, if the heat-sealing bars are 1/2 inch wide, the cooling bars may be only 1/16 inch wide. While the cooling bars may contact the single seal, they need not actually apply a compression force while cooling under tension, and in fact, the gap between the cooling bars may be used to control the thickness of the single seal. For example, the envelope material, including the seal, may shrink in the Z-direction (up/down) due to the heating, and when cooling, the envelope material, including the seal, may expand in the Z-direction. When the envelope material or the seal touches the cooling bars, the seal cools and keeps that thickness (between the cooling bars), or something close to that thickness.

Alternatively, the cooling bars may not be used. Rather, the heat-sealed six layers of envelope material may simply be "air cooled" using a jet of cold air to cool or the envelope material may be allowed to return to the ambient temperature (e.g. room temperature) naturally while under the tension. As an example, a jet of cold air may be generated using a vortex tube chiller or other air chilling methods. Using a cold air jet or ambient temperature for cooling may avoid actually physically contacting the envelope material and may therefore also avoid any compression that may occur while cooling with the use of cooling bars.

In either case (with or without cooling bars), as noted above all six layers of the envelope material may need to be tensioned along single seal (or machine direction) during the cooling process in order to prevent or reduce shrinkage of the seal in the machine direction. If this cooling without the tension, this may allow for free movement of the polymer chains of the envelope material in both the machine and transverse directions and may reduce stress buildup from the heat-sealing. However, this may result in slower manufacturing time, increased shrinkage and alignment challenges.

The features described herein provide for manufacture of aerial vehicles including envelopes with gores made from highly oriented. In addition, the features described herein provide for improved seal quality and thereby improved flight time. In addition, the six-layer configuration of layers described herein may provide for a simple fin seal which avoids the complexities of arranging and securing materials required for a lap seal.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An aerial vehicle comprising:
an envelope including a plurality of gores having a seal arranged between a pair of adjacent gores extending along the common edges of the adjacent gores, said seal having a arrangement of layers of envelope material comprising:
a first layer of envelope material defined by a first strip of envelope material;
adjacent to the first layer of the envelope material is a second layer of the envelope material which is a second strip of envelope material stacked on top of the first strip;
a first gore of envelope material, the first gore having a first gore edge portion extending along the length of the first gore adjacent and stacked on top of said second strip defining a third layer;
a second gore of envelope material, the second gore having a second gore edge portion, the second gore edge portion aligned with and stacked on top of the first gore edge portion defining a fourth layer;
a folded portion of envelope material having a c-shaped arrangement and stacked on top of said second gore edge portion, wherein said folder portion defines a fifth layer adjacent to said second gore edge portion and a sixth layer folded overtop of said fifth layer;
a tendon carried between said fifth and sixth layers of said folded portion; and
wherein the seal includes all six layers of envelope material sealed together and retains the tendon within the folded portion.

2. The aerial vehicle of claim 1, wherein the strip is overlapping exterior surfaces of the first gore and the second gore.

3. The aerial vehicle of claim 1, wherein the second gore is aligned on a first side of the first gore.

4. The aerial vehicle of claim 3, wherein the first strip overlaps with the first gore on a second side of the first gore, opposite the first side.

5. The aerial vehicle of claim 3, wherein the second strip is adjacent the first strip on a side opposite the first gore.

6. The aerial vehicle of claim 1, wherein the seal area comprises a heat-sealed area.

7. The aerial vehicle of claim 1, wherein the envelope material comprises a biaxial oriented polyethylene film.

8. The aerial vehicle of claim 1, wherein the folded portion overlaps the second gore on a side opposite the first gore.

9. The aerial vehicle of claim 1, wherein the seal area extends along a first portion of the first gore and a first portion of the second gore.

10. The aerial vehicle of claim 9, wherein a second portion of the first gore and a second portion of the second gore are not within the seal area.

11. The aerial vehicle of claim 1, further comprising a base plate connected to the envelope.

12. The aerial vehicle of claim 1, further comprising a top plate connected to the envelope.

13. The aerial vehicle of claim 1, further comprising a pay load attached to the envelope through a connection.

14. An aerial vehicle comprising:
an envelope including a plurality of gores having a seal arranged between a pair of adjacent gores extending along the common edges of the adjacent gores, said seal comprising:
a first gore comprising an envelope material, the first gore having a first gore edge portion;
a second gore comprising the envelope material, the second gore having a second gore edge portion, the second gore edge portion aligned with and stacked on top of the first gore edge portion;
a folded portion of envelope material having a c-shape arrangement defining a first folded layer and a second folded layer, the first and second folded layers overlapping each other and stacked on top of the second gore edge portion; and
a seal area extending through the first and second gore edge portions and the first and second folded layers.

15. The aerial vehicle of claim 14, further comprising a tendon within the first and second folded layers.

16. The aerial vehicle of claim 14, wherein the seal comprises:
a first strip of envelope material overlapping the first gore edge portion; and
a second strip of envelope material overlapping the first strip of envelope material.

* * * * *